United States Patent
Priel et al.

(10) Patent No.: US 9,178,730 B2
(45) Date of Patent: Nov. 3, 2015

(54) CLOCK DISTRIBUTION MODULE, SYNCHRONOUS DIGITAL SYSTEM AND METHOD THEREFOR

(75) Inventors: Michael Priel, Netanya (IL); David Dzebisashvili, Tel Aviv (IL); Leonid Fleshel, Hertzelia (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/373,924

(22) PCT Filed: Feb. 24, 2012

(86) PCT No.: PCT/IB2012/050867
§ 371 (c)(1),
(2), (4) Date: Jul. 23, 2014

(87) PCT Pub. No.: WO2013/124713
PCT Pub. Date: Aug. 29, 2013

(65) Prior Publication Data
US 2015/0098540 A1    Apr. 9, 2015

(51) Int. Cl.
| H04L 7/00 | (2006.01) |
| H04L 25/45 | (2006.01) |
| G06F 1/10 | (2006.01) |
| H04L 25/44 | (2006.01) |

(52) U.S. Cl.
CPC ....... H04L 25/45 (2013.01); G06F 1/10 (2013.01); H04L 25/44 (2013.01)

(58) Field of Classification Search
CPC ......... G06F 1/10; G06F 13/1689; G06F 1/04; G06F 2217/62; G06F 11/0709; G06F 2213/0038; G06F 13/4217; G06F 13/4291; H03L 7/08; G11C 5/063; G11C 29/023; G11C 7/222; G11C 7/1093; G11C 29/81
USPC ................... 375/356, 354; 327/295, 296, 298
See application file for complete search history.

(56) References Cited

U.S. PATENT DOCUMENTS

| 5,550,875 | A | 8/1996 | Bennett |
| 6,088,254 | A | 7/2000 | Kermani |
| 6,594,772 | B1 | 7/2003 | Tsai et al. |
| 6,897,699 | B1 * | 5/2005 | Nguyen ............... G06F 1/10 327/295 |
| 7,290,162 | B2 | 10/2007 | Swarbrick et al. |
| 7,392,495 | B1 | 6/2008 | Cherukupalli et al. |
| 2008/0284483 | A1 * | 11/2008 | Nakashima .................. 327/293 |

OTHER PUBLICATIONS

International Search Report and Written Opinion correlating to PCT/IB2012/050867 dated Nov. 29, 2012.

* cited by examiner

Primary Examiner — Rahel Guarino

(57) ABSTRACT

A clock distribution module for a digital synchronous system is described. The clock distribution module comprising a first node arranged to comprise a clock signal comprising a propagation delay relative to a reference clock signal, at least one further node arranged to comprise a clock signal comprising a propagation delay relative to the reference clock signal corresponding to that of the first node, and a clock configuration module. The clock configuration module is arranged to receive at least one indication of clock skew between the first node and at least one further node of the clock distribution module, and to selectively couple the first node to the at least one further node based at least partly on the at least one indication of clock skew there between.

20 Claims, 3 Drawing Sheets

CLOCK DISTRIBUTION MODULE, SYNCHRONOUS DIGITAL SYSTEM AND METHOD THEREFOR

FIELD OF THE INVENTION

This invention relates to a clock distribution module, a synchronous digital system and a method of configuring a clock tree distribution network.

BACKGROUND OF THE INVENTION

In a synchronous digital system, a clock signal is used to define a time reference for the movement of data within that system. A clock distribution network (often referred to as a clock distribution tree) distributes the clock signal(s) from a common point to the various synchronous elements within that clock domain. FIG. 1 illustrates a simplified example of a clock distribution network 100. Clock distribution networks typically comprise the greatest fan-out of all signals within a synchronous digital system, and typically operate at the highest speeds of any signals, either control or data, within the synchronous system. Since the transmission of data signals relies on a temporal reference provided by clock signals, the waveforms of those clock signals must be particularly clean and sharp. Furthermore, because long interconnect lines become significantly more resistive as line dimensions are decreased, clock signals are particularly affected by technology scaling.

Synchronous digital systems typically comprise cascaded banks of sequential registers with combinational logic between each set of registers. The functional requirements of the digital system are satisfied by the various logic stages, with timing requirements between the logic stages being controlled through appropriate clock signals provided to the respective registers. The proper design of the clock distribution network ensures that these critical timing requirements are satisfied. Thus, the reliability and accuracy of the clock signals has a significant impact on the maximum performance of the entire synchronous system.

Furthermore, the clock distribution network is often responsible for a significant proportion of the overall power consumption of an integrated circuit device therefor. One power saving technique often implemented within synchronous digital systems is dynamic frequency scaling (DFS), wherein the frequency of the clock signal(s) may be dynamically controlled to either reduce power consumption by reducing the frequency of the clock signal(s) or to increase performance by increasing the frequency of the clock signal(s). Such dynamic frequency scaling is often implemented with dynamic voltage scaling (DVS), whereby the supply voltage to elements within the synchronous digital system may be increased or decreased depending on the system requirements; the combined implementation of DFS and DVS typically referred to as dynamic voltage and frequency scaling (DVFS). For example, when low power consumption is a priority, the voltage supply may be reduced along with the clock frequency. Conversely, when high performance is a priority, the voltage supply may be increased along with the clock frequency, to enable fast switching of signals.

A mesh clock tree configuration is a known clock distribution network configuration comprising shorting between clock tree layers with the same propagation delay. This results in a multi-driven mode in which meshed clock nodes are driven by multiple clock tree registers. In this manner, skew between different clock tree branches may be reduced. Ideally, a mesh clock tree configuration should be implemented over an H-tree clock tree design, where all branches are totally symmetrical. FIG. 2 illustrates a simplified example of such an H-tree design 200. Within an ideal H-tree design, on chip variation is the only cause for skew, which can be reduced by shortening the length of branches. Thus, in an ideal H-tree clock tree design, branches will have skew, and so current through shorting lines will be limited.

In practice, H-tree implementation has many constraints due to the impact that it can have on functional components within the synchronous digital system. For example, memory elements typically have constraints for their placement, often resulting in an asymmetrical, non-rectangular layout. Furthermore, imposing fixed pre-placement of clock buffers and pre-routing of clock distribution nets with shielding can impact critical paths of the functional design for a synchronous digital system. Additionally, H-tree clock tree power consumption in low activity applications is higher than a normal clock tree configuration. Normal clock tree configurations are typically balanced for typical PVT (process, voltage, temperature) conditions, but suffer from elevated skew over PVT (process, voltage temperature) variations due to the non-symmetrical nature of branches within the network. Such elevated skew can be problematic for both setup and hold timing closure. The skew within a normal clock distribution network configuration may be reduced by applying connections between clock layers with the same propagation delay to create shorts there between. FIG. 3 illustrates a simplified example of the clock distribution network 100 of FIG. 1, comprising a normal clock tree configuration and with shorting connections applied between clock layers with the same propagation delay, as illustrated by the broken lines at 300. In this manner, a crude mesh clock tree may be achieved from a normal clock tree configuration, simplifying the practical implementation of such a mesh clock tree. However, the non-symmetrical nature of the branches within such a crude mesh clock tree design typically result in a high current through shorting lines, thereby increasing the power consumption of the clock distribution network.

Thus, a mesh clock tree implementation enables low skew to be achieved throughout the digital synchronous system, which enables good setup and hold timing closure, and thus enables high speed applications to be achieved. However, ideal mesh (H-Tree) clock tree implementations are difficult to implement in practice, and more crude mesh clock tree implementations suffer from high power consumption which is undesirable for low power applications. Conversely, a normal clock tree implementation has a lower power consumption than a mesh clock tree implementation at lower speeds, but suffers from high skew (especially over process/voltage/temperature ranges), which is problematic for high speed applications due to setup and hold timing issues. Accordingly, neither a mesh clock tree implementation nor a normal clock tree implementation provides an ideal solution across both high speed and low power configurations, for example such as may be desired within a digital synchronous system in which DVFS is implemented.

SUMMARY OF THE INVENTION

The present invention provides a clock distribution module, a synchronous digital system and a method of configuring a clock tree distribution network as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
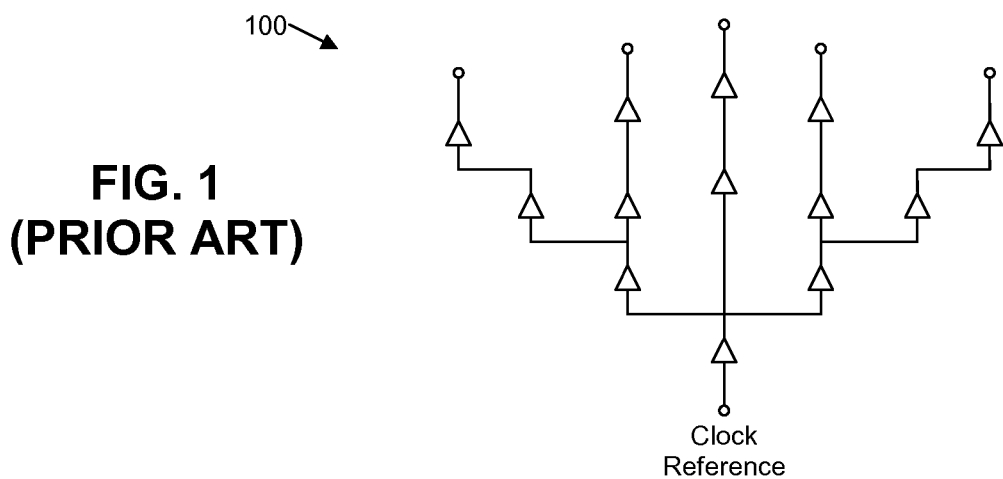
FIG. 1 illustrates a simplified example of a clock distribution network.
Figure 2:
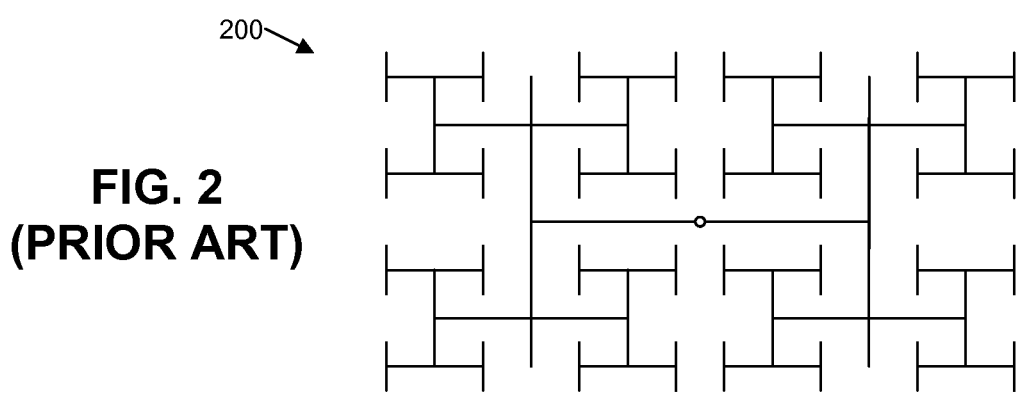
FIG. 2 illustrates a simplified example of an H-tree design.
Figure 3:
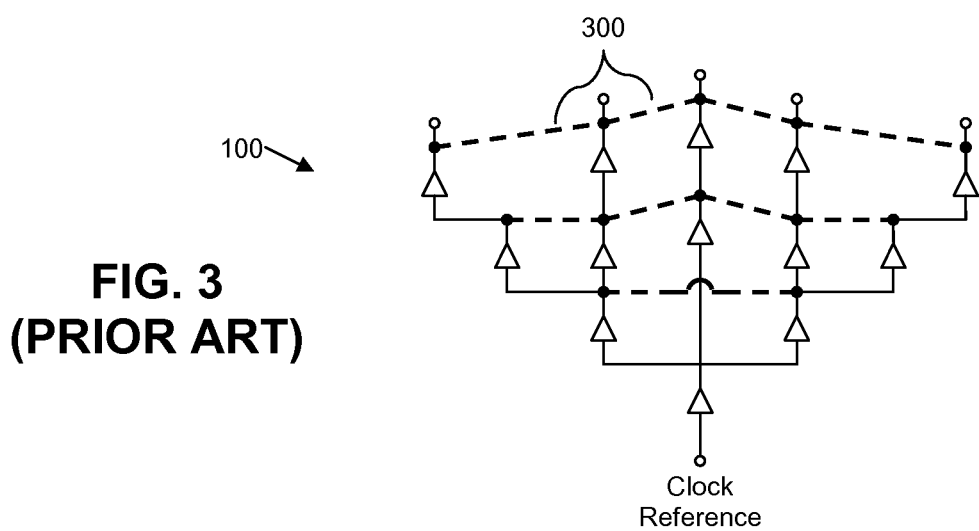
FIG. 3 illustrates a simplified example of the clock distribution network of FIG. 1 comprising shorting connections applied between clock layers with the same propagation delay.
Figure 4:
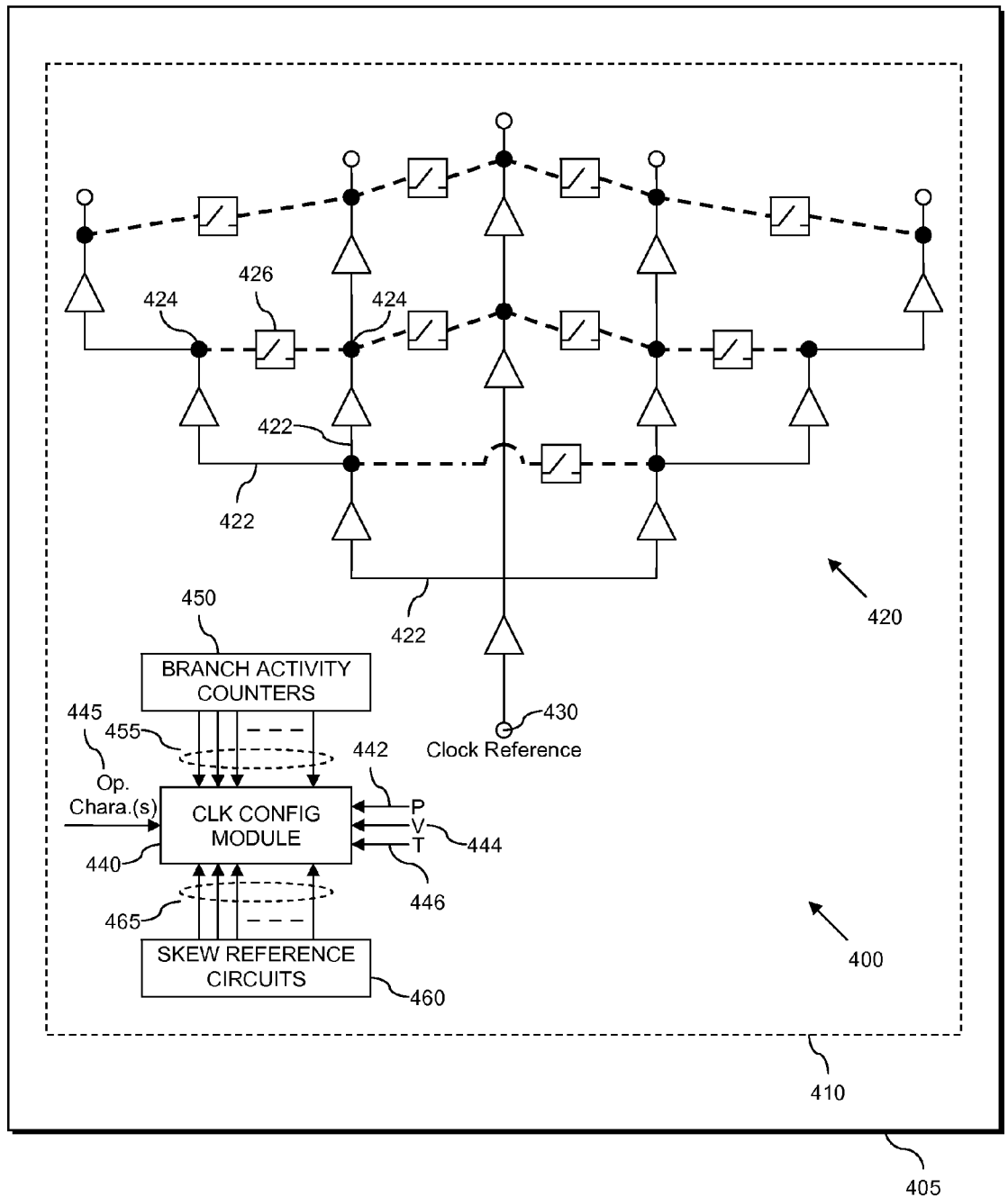
FIG. 4 illustrates a simplified block diagram of an example of a clock distribution module.

Referring first to FIG. 4, there is illustrated a simplified block diagram of an example of a clock distribution module 400 for a synchronous digital system 410. In the illustrated example the clock distribution module 400 is implemented within an integrated circuit device 405 comprising at least one die within a single integrated circuit package. Furthermore, in the illustrated example, the clock distribution module 400 comprises a clock distribution network 420 comprising a clock distribution tree configuration. However, it will be appreciated that the present invention is not limited to such a clock distribution tree configuration, and may equally be applied to clock distribution networks comprising alternative topologies.

Because the illustrated embodiments of the present invention may for the most part be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In the illustrated example, the clock distribution network 420 of the clock distribution module 400 comprises a plurality of propagation paths, or 'branches', operably coupled to a clock reference signal 430 and 'fanning out' therefrom. In FIG. 4, these branches are illustrated by way of solid lines, such as those illustrated at 422. Each branch 422 comprises one or more clock nodes, such as those illustrated at 424. Each clock node 424 is arranged to comprise a clock signal derived from the clock reference signal 430, and comprising a propagation delay relative to the reference clock signal 430 resulting from the propagation of the reference clock signal 430 through the respective branch 422 between the clock reference signal 430 and the node 424. One or more of the nodes 424 may provide clock signals to functional components such as sequential registers (not shown) within the synchronous digital system 410. Advantageously, such a clock distribution network configuration in which branches 422 are not all required to be substantially symmetrical is not subject to the same implementation constraints as an 'ideal' H-tree configuration.

The clock distribution module 400 further comprises a clock configuration module 440 arranged to receive at least one indication of clock skew between nodes 424 of the clock distribution network 420, and to selectively configure 'mesh' connections between nodes 424 based at least partly on the received indication(s) of clock skew there between. For example, the clock configuration module 440 may be arranged to receive one or more indications of clock skew between a first node 424 and a second node 424, said first and second nodes 424 being arranged to comprise respective clock signals comprising a corresponding propagation delay relative to the reference clock signal 430. The clock configuration module 440 may further be arranged to determine a level of skew between the first node 424 and the second node 424 based at least partly on the received indication(s), as described in greater detail below, compare the determined level of skew to a skew threshold level, and selectively couple the first node 424 to the second node 424 upon the determined level of skew being greater than the skew threshold level.

In this manner, by selectively coupling a first node 424 to a second node 424 based at least partly on a skew there between, or an indication thereof, at least parts of the clock distribution network 420 are able to be dynamically configured between a mesh clock tree configuration and a normal (i.e. non-mesh) clock tree configuration depending on, in this example, a determined level of skew between nodes 424 within the clock distribution network 420. Significantly, by enabling nodes to be selectively coupled to one another in this manner to create 'mesh' connections (as illustrated by broken lines in FIG. 4), the level of skew between those nodes 424 of the clock distribution network may be significantly reduced, enabling a 'high speed' configuration. Conversely, by enabling the nodes to be selectively isolated from one another, high current flow through 'mesh' connections between nodes 424, resulting from the non-symmetrical nature of the branches 422 within such a clock tree design, may be substantially alleviated, thereby reducing the power consumption of the clock distribution network 420, enabling a 'low power' configuration. As such, the clock distribution network 420 may be dynamically configured between high speed and low power configurations, for example such as may be desired within a digital synchronous system in which DVFS is implemented.

In some examples, the clock configuration module 440 may be arranged to receive one or more indications of clock skew between nodes 424 comprising, say, one or more indications of conditions that may affect the functionality of components within the integrated circuit device 405, and thus that may have an effect an on amount of skew between clock signals present at nodes 424 within the clock distribution network 420. For example, the clock configuration module 440 may be arranged to receive an indication of a process corner for the integrated circuit device 405 within which the clock distribution module 400 is implemented, such as illustrated at 442. Additionally/alternatively, the clock configuration module 440 may be arranged to receive one or more indications of a voltage supply level for at least a part of the clock distribution module 400 and/or clock distribution network 420, such as illustrated at 444. Additionally/alternatively, the clock configuration module 440 may be arranged to receive one or more indications of a junction temperature for at least a part of the clock distribution module 400 and/or clock distribution network 420, such as illustrated at 446.

The inventors have further recognized that aging of components within the network distribution network 420 may also lead to skew between clock signals present at nodes 424 developing over time. For example, branches 422 that have less activity experience a different aging effect from more active branches 422. Thus with time of activity difference between clock tree branches timing is growing, that leading to additional skew. In some applications, such as within mobile products, there is very high difference between typical activity and worst case activity. Accordingly, over the lifetime of such applications, a significant amount of skew may develop between clock signals present at nodes 424 within the respective clock distribution network. Accordingly, in some examples, the clock configuration module 440 may additionally/alternatively be arranged to receive one or more indications of clock skew between nodes 424 comprising, say, one or more indications of branch activity for the respective nodes 424. For example, and as illustrated at 450, the clock distribution module 400 may comprise one or more counters arranged to track activity for one or more branches of the clock distribution network 420. In this manner, the clock configuration module 440 may arrange to receive, from the branch activity counter(s) 450, one or more indications of clock skew comprising one or more indications 455 of branch activity for branches 422 within the clock distribution network 420.

In some examples, the clock distribution module 400 may further comprise skew reference circuits, such as illustrated generally at 460, arranged to measure skew between nodes 424 within the clock distribution network 422. Accordingly, in some examples the clock configuration module 440 may be arranged to receive one or more indications of clock skew between nodes 424 comprising, say, one or more indications 465 of measured skew between nodes 424 within the clock distribution network 420.

Having received the one or more indications of clock skew between nodes 424, the clock configuration module 440 may then determine a level of skew between the nodes 424. For example, a level of skew may be determined based upon estimating a variation from a default level of skew according to the indications received. For example, if process corner and/or voltage and/or temperature is/are indicated as being outside of a specific range, an appropriate bias may be applied to the default level of skew in order to provide an estimated level of skew. Additionally, any variation between branch activity for the respective nodes beyond a threshold amount of variation may result in a further bias (complimentary or opposing) may be applied to the default level of skew in order to further refine the estimated level of skew. Additionally/alternatively, the level of skew may be determined based on the indications 465 of measured skew received.

Having determined a level of skew between the nodes 424, the clock configuration module 440 may then be arranged to compare the determined level of skew to a skew threshold level, and to selectively couple nodes 424 together upon the determined level of skew being greater than the skew threshold level. In this manner, when the determined level of skew exceeds the threshold level, for example when such skew may prevent setup and hold timing closure requirements being met within the synchronous digital system 410, the clock configuration module 440 may be arranged to dynamically configure at least parts of the clock distribution network 420 to comprise a mesh clock tree configuration. Conversely, when the determined level of skew is below the threshold level, the clock configuration module 440 may be arranged to dynamically configure those parts of the clock distribution network 420 to comprise a normal (non-mesh) clock tree configuration.

In some examples, such a threshold value may comprise a predefined, fixed threshold level. However, in some alternative examples, such a threshold level may be determined base on, say one or more operational characteristics of at least a part of the synchronous digital system 410. For example, the threshold level may be determined based upon an operating mode of the synchronous digital system 410. For example, a lower threshold level may be configured when the synchronous digital system 410 is operating in a high performance mode in which a high operating frequency is required. Conversely, a higher threshold level may be configured when the synchronous digital system 410 is operating in a lower power mode in which reduced power consumption is required. Additionally/alternatively, the threshold level may be determined based on, say, a more direct indication of an operating frequency and/or supply voltage level for at least a part of the synchronous digital system 410. For example, a lower threshold level may be configured when the synchronous digital system 410 comprises a higher operating frequency in order to enable fast setup and hold timing closure to be achieved. Additionally/alternatively, a lower threshold level may be configured when the synchronous digital system 410 comprises a lower supply voltage level in order to at least partially compensate for slower switching speeds as a result of the lower voltage levels. Conversely, a higher threshold level may be configured when the synchronous digital system 410 comprises a lower operating frequency in order to reduce the power consumption of the clock distribution network 420 when fast setup and hold timing closure is not required. Additionally/alternatively, a higher threshold level may be configured when the synchronous digital system 410 comprises a higher supply voltage level, again to reduce the power consumption of the clock distribution network 420 when it is not necessary to compensate for slower switching speeds.

Thus, in the example illustrated in FIG. 4, the clock configuration module 440 may be further arranged to receive at least one indication of an operational characteristic, as illustrated generally at 445, for at least a part of the synchronous digital system 410, and determine the skew threshold level based at least partly on the received at least one indication of an operational characteristic.

For example, the clock configuration module 440 may be arranged to determine a lower skew threshold level upon receipt of an indication 445 of a higher performance operating mode for at least part of the synchronous digital system 410, and to determine a higher skew threshold level upon receipt of an indication 445 of a reduced power consumption operating mode for the at least part of the synchronous digital system 410.

Additionally/alternatively, the clock configuration module 440 may be arranged to determine a lower skew threshold level upon receipt of an indication 445 of a higher operating frequency for at least part of the synchronous digital system 410, and to determine a higher skew threshold level upon receipt of an indication 445 of a lower operating frequency for at least part of the synchronous digital system 410.

Additionally/alternatively, the clock configuration module 440 may be arranged to determine a lower skew threshold level upon receipt of an indication 445 of a lower supply voltage level for at least part of the synchronous digital system 410, and to determine a higher skew threshold level upon receipt of an indication 445 of a higher supply voltage level for at least part of the synchronous digital system 410.

For the example illustrated in FIG. 4, the clock distribution network 420 comprises switching elements 426. Each switching element 426 may be operably coupled between a first node 424 and a second node 424, said pair of nodes 424 being arranged to comprise respective clock signals comprising a corresponding propagation delay relative to the reference clock signal 430. Such a switching element 426 may be implemented by way of, say, a transfer gate comprising an nmos (n-channel metal oxide semiconductor transistor) and a pmos (p-channel metal oxide semiconductor transistor) connected in parallel between the respective nodes 424. Each switching element 426 may be selectively configurable to operably couple the pair of nodes 424 together. For example, the clock configuration module 440 may receive one or more indications of clock skew between, say, a pair of nodes 424 between which a switching element 426 is operably coupled, and to selectively configure the respective switching element 426 based at least partly on the received indication(s) of skew between the pair of nodes 424. For example, the clock configuration module 440 may be arranged to selectively configure a switching element 426 to operably couple the pair of nodes 424 together, substantially creating a short there between, upon a determined level of skew there between being greater than a skew threshold level. Conversely, the clock configuration module 440 may be arranged to selectively configure a switching element 426 to substantially isolate the pair of nodes 424, upon a determined level of skew there between being less than a skew threshold level. In this manner, the clock configuration module 440 is able to dynamically configure the clock distribution network 420 between a mesh clock tree configuration and a normal (i.e. non-mesh) clock tree configuration depending on, for example, a determined level of skew between one or more pairs of nodes 424 within the clock distribution network 420.

In the illustrated example, the clock distribution network 420 comprises a plurality of switching elements 426; each switching element 426 being operably coupled between a pair of nodes 424, and selectively configurable to operably couple the pair of nodes 424 together. In some examples, the clock configuration module 440 may be arranged to determine a level of skew representative of skew levels between respective pairs of nodes 424 across the clock distribution network 420 as a whole, and to selectively configure the switching elements 426 to operably couple their respective pairs of nodes 424 together as a single group, based on this representative level of skew across the clock distribution network 420 as a whole. In this manner, the clock configuration module 440 may be arranged dynamically configure the clock distribution network 420 as a whole between a mesh clock tree configuration and a normal (i.e. non-mesh) clock tree configuration depending on, in this example, a determined level of skew representative of skew across the clock distribution network 420.

Alternatively, in some examples, the clock configuration module 440 may be arranged to determine a level of skew for individual pairs of nodes 424 between which a switching element 426 is operably coupled, and to selectively configure the switching elements 426 to operably couple their respective pairs of nodes 424 individually, based on the determined individual levels of skew. Additionally/alternatively, the clock configuration module 440 may be arranged to determine levels of skew representative of skew levels for different parts of the clock distribution network 420, and to selectively configure the switching elements 426 within each part of the clock distribution network 420 to operably couple their respective pairs of nodes 424 together as a group, based on the respective representative level of skew across that part of the clock distribution network 420. In this manner, the clock configuration module 440 may be arranged dynamically configure individual parts of the clock distribution network 420 between a mesh clock tree configuration and a normal (i.e. non-mesh) clock tree configuration depending on, in this example, a determined level of skew for that part of the clock distribution network 420.

Figure 5:
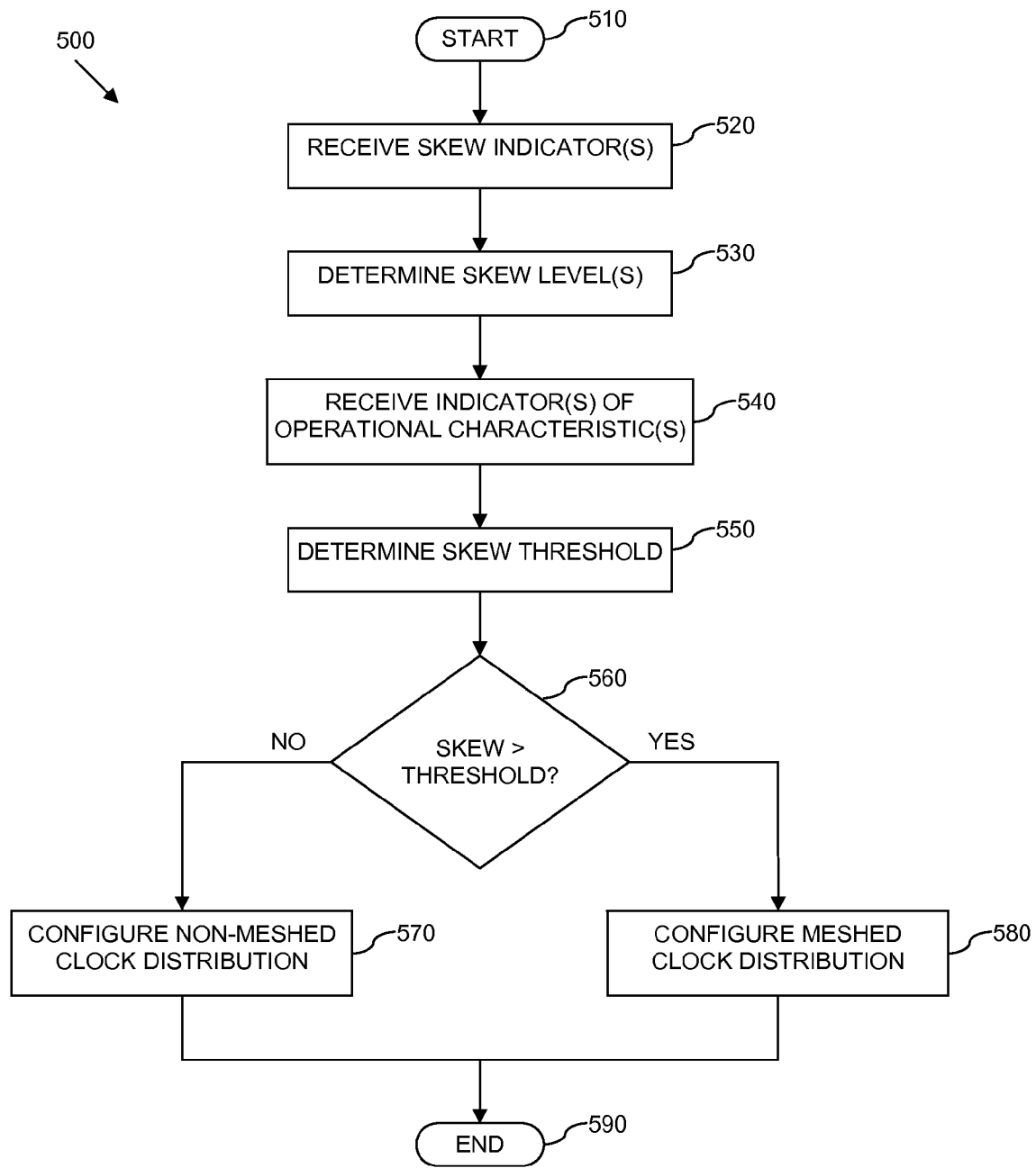
FIG. 5 illustrates a simplified flowchart of a method of configuring a clock tree distribution network.

Referring now to FIG. 5, there is illustrated a simplified flowchart 500 of an example of a method of configuring a clock tree distribution network, such as may be implemented within the clock distribution module 400 of FIG. 4. The method starts at 510, and moves on to 520 with the receipt of one or more indications of clock skew between nodes within the clock tree distribution network. For example, such clock skew indication(s) may comprise one or more indications of conditions that may affect the functionality of components within an integrated circuit device within which the clock distribution network is implemented, and thus that may have an effect an on amount of skew between clock signals present at nodes within the clock distribution network. Accordingly, such indication(s) may comprise an indication of a process corner for the integrated circuit device within which the clock distribution network is implemented, a voltage supply level for at least a part of the clock distribution network and/or a junction temperature for at least a part of the clock distribution network. Additionally/alternatively, such indication(s) may comprise one or more indications of branch activity within the clock distribution network and/or one or more indications of measured skew between nodes within the clock distribution network.

Next, at 530, one or more skew level(s) within the clock distribution network may be determined. For example, a level of skew representative of skew levels across the clock distribution network as a whole may be determined. Alternatively, skew levels may be determined for different parts of the clock distribution network, for example for individual pairs of nodes within the clock distribution network, or defined groups thereof.

One or more indicators of one or more operational characteristics of a synchronous digital system of which the clock distribution network forms a part may then be received, at 540. For example, such indication(s) may comprise one or more indications of, say, an operational mode of at least a part of the synchronous digital system and/or an operating frequency of at least a part of the synchronous digital system and/or a supply voltage level of at least a part of the synchronous digital system.

Next, at 540, a skew threshold level may be determined based at least partly on the received indication(s) of operational characteristics. For example, a lower skew threshold level may be determined upon receipt of an indication of a higher performance operating mode for at least part of the synchronous digital system, whilst a higher skew threshold level may be determined upon receipt of an indication of a reduced power consumption operating mode for the at least part of the synchronous digital system. Additionally/alternatively, a lower skew threshold level may be determined upon receipt of an indication of a higher operating frequency for at least part of the synchronous digital system, whilst a higher skew threshold level may be determined upon receipt of an indication of a lower operating frequency for at least part of the synchronous digital system. Additionally/alternatively, a lower skew threshold level may be determined upon receipt of an indication of a lower supply voltage level for at least part of the synchronous digital system, whilst a higher skew threshold level may be determined upon receipt of an indication of a higher supply voltage level for at least part of the synchronous digital system.

Next, at 560, it is determined whether the (or each) determined skew level is greater than the skew threshold level. If the determined skew level is not greater than the skew threshold level, the method moves on to 570, where respective pairs of nodes to which the determined skew level relates may be configured to be substantially isolated from each other. In this manner, a normal (non-meshed) configuration is configured within (that part of) the clock distribution network, thereby reducing the power consumption therefor. Conversely, if the determined skew level is greater than the skew threshold level, the method moves on to 580, where respective pairs of nodes to which the determined skew level relates are configured to be operatively coupled to one another. In this manner, a meshed configuration is configured within (that part of) the clock distribution network, thereby enabling the skew between said pairs of nodes to be reduced. The method then ends, at 590.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, for clarity and ease of understanding, the branch activity counters 450 and skew reference circuits 460 have been illustrated as separate logical components in relation to the clock configuration module 440. However, it will be appreciated that the branch activity counters 450 and/or skew reference circuits 460 may equally be implemented as integral components within the clock configuration module 440.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, in the example illustrated in FIG. 4, the synchronous digital system 410 is illustrated as being implemented within a single integrated circuit device 405. Alternatively, the examples may be implemented as any number of separate integrated circuits or separate devices interconnected with each other in a suitable manner. For example, in some examples, the digital synchronous system 410, and thus the clock distribution network 420, may be implemented across a plurality of integrated circuits. Accordingly, components of the clock distribution module 400 may equally be distributed across the plurality of integrated circuit devices.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A clock distribution module for a digital synchronous system, the clock distribution module comprising:
   a first node arranged to comprise a clock signal comprising a propagation delay relative to a reference clock signal;
   at least one further node arranged to comprise a clock signal comprising a propagation delay relative to the reference clock signal corresponding to that of the first node; and
   a clock configuration module;

wherein the clock configuration module is arranged to receive at least one indication of clock skew between the first node and at least one further node of the clock distribution module, and to selectively couple the first node to the at least one further node based at least partly on the at least one indication of clock skew there between.

2. The clock distribution module of claim 1, wherein the clock configuration module is arranged to receive at least one indication of clock skew between the first and at least one further nodes comprising at least one from a group comprising:
- an indication of a process corner of an integrated circuit device within which the clock distribution module is implemented;
- an indication of a voltage supply level for at least a part of the clock distribution module;
- an indication of a junction temperature for at least a part of the clock distribution module;
- an indication of branch activity for the first and at least one further nodes; and
- an indication of measured skew between the first and at least one further nodes.

3. The clock distribution module of claim 1, wherein the clock configuration module is arranged to:
- determine a level of skew between the first and at least one further nodes based at least partly on the received at least one indication;
- compare the determined level of skew to a skew threshold level; and
- selectively couple the first node to the at least one further node upon the determined level of skew being greater than the skew threshold level.

4. The clock distribution module of claim 3, wherein the clock configuration module is further arranged to receive at least one indication of an operational characteristic for at least a part of the synchronous digital system, and determine the skew threshold level based at least partly on the received at least one indication of an operational characteristic.

5. The clock distribution module of claim 4, wherein the clock configuration module is arranged to:
- determine a lower skew threshold level upon receipt of an indication of a higher performance operating mode for the at least part of the synchronous digital system; and
- determine a higher skew threshold level upon receipt of an indication of a reduced power consumption operating mode for the at least part of the synchronous digital system.

6. The clock distribution module of claim 4, wherein the clock configuration module is arranged to:
- determine a lower skew threshold level upon receipt of an indication of a higher operating frequency for the at least part of the synchronous digital system; and
- determine a higher skew threshold level upon receipt of an indication of a lower operating frequency for the at least part of the synchronous digital system.

7. The clock distribution module of claim 4, wherein the clock configuration module is arranged to:
- determine a lower skew threshold level upon receipt of an indication of a lower supply voltage level for the at least part of the synchronous digital system; and
- determine a higher skew threshold level upon receipt of an indication of a higher supply voltage level for the at least part of the synchronous digital system.

8. The clock distribution module of claim 1, wherein the clock distribution module further comprises at least one switching element operably coupled between the first and at least one further node, and selectively configurable to operably couple the first node to the at least one further node.

9. The clock distribution module of claim 8, wherein the clock configuration module being further arranged to:
- selectively configure the at least one switching element to operably couple the first node to the at least one further node upon a determined level of skew between the first and at least one further nodes being greater than a skew threshold level; and
- selectively configure the at least one switching element to isolate the first node from the at least one further node upon a determined level of skew between the first and at least one further nodes being less than a skew threshold level.

10. The clock distribution module of claim 1 implemented within an integrated circuit device comprising at least one die within a single integrated circuit package.

11. A synchronous digital system comprising a clock distribution module, the clock distribution module comprising:
- a first node arranged to comprise a clock signal comprising a propagation delay relative to a reference clock signal;
- at least one further node arranged to comprise a clock signal comprising a propagation delay relative to the reference clock signal corresponding to that of the first node; and
- a clock configuration module;

wherein the clock configuration module is arranged to receive at least one indication of clock skew between the first node and at least one further node of the clock distribution module, and to selectively couple the first node to the at least one further node based at least partly on the at least one indication of clock skew there between.

12. A method of configuring a clock tree distribution network, the method comprising:
- receiving at least one indication of clock skew between a first node of the clock distribution module and at least one further node of the clock distribution module; and
- selectively coupling the first node to the at least one further node based at least partly on the at least one indication of clock skew there between.

13. The method of claim 12, wherein the method comprises:
- receiving at least one indication of clock skew between a first node of the clock distribution module and at least one further node of the clock distribution module;
- determining a level of skew between the first and at least one further nodes based at least partly on the received at least one indication;
- comparing the determined level of skew to a skew threshold level; and
- selectively coupling the first node to the at least one further node upon the determined level of skew being greater than the skew threshold level.

14. The method of claim 13, further comprising:
- receiving at least one indication of an operational characteristic for at least a part of the synchronous digital system; and
- determining the skew threshold level based at least partly on the received at least one indication of an operational characteristic.

15. The method of claim 14, further comprising:
- determining a lower skew threshold level upon receipt of an indication of a higher performance operating mode for the at least part of the synchronous digital system; and determining a higher skew threshold level upon receipt of an indication of a reduced power consumption operating mode for the at least part of the synchronous digital system.

16. The method of claim 14, further comprising:

determining a lower skew threshold level upon receipt of an indication of a higher operating frequency for the at least part of the synchronous digital system; and determining a higher skew threshold level upon receipt of an indication of a lower operating frequency for the at least part of the synchronous digital system.

17. The synchronous digital system of claim 11, wherein the clock configuration module is arranged to:

determine a level of skew between the first and at least one further nodes based at least partly on the received at least one indication;

compare the determined level of skew to a skew threshold level; and selectively couple the first node to the at least one further node upon the determined level of skew being greater than the skew threshold level.

18. The synchronous digital system of claim 17, wherein the clock configuration module is further arranged to receive at least one indication of an operational characteristic for at least a part of the synchronous digital system, and determine the skew threshold level based at least partly on the received at least one indication of an operational characteristic.

19. The synchronous digital system of claim 18, wherein the clock configuration module is arranged to:

determine a lower skew threshold level upon receipt of an indication of a higher performance operating mode for the at least part of the synchronous digital system; and determine a higher skew threshold level upon receipt of an indication of a reduced power consumption operating mode for the at least part of the synchronous digital system.

20. The synchronous digital system of claim 18, wherein the clock configuration module is arranged to:

determine a lower skew threshold level upon receipt of an indication of a higher operating frequency for the at least part of the synchronous digital system; and determine a higher skew threshold level upon receipt of an indication of a lower operating frequency for the at least part of the synchronous digital system.

* * * * *